INVENTOR
BENJAMIN W. BARLOW
BY
ATTORNEY

United States Patent Office 3,504,539
Patented Apr. 7, 1970

3,504,539
COMBINED TRANSMISSION GEARING AND
TORQUE MEASURING APPARATUS
Benjamin William Barlow, Harrow Weald, England, assignor, by mesne assignments, to Rolls-Royce Limited, Derby, England, a British company
Filed Dec. 22, 1967, Ser. No. 694,778
Claims priority, application Great Britain, Dec. 23, 1966, 57,748/66
Int. Cl. G01l 3/14
U.S. Cl. 73—136                                     9 Claims

ABSTRACT OF THE DISCLOSURE

Combined transmission gearing and torque measuring apparatus comprising transmission gearing having helical teeth whereby an axial load is applied between meshing gears during transmission of torque, fluid pressure operated means opposing movement under the axial load, and a control for the fluid pressure arranged to vary the fluid pressure with increasing movement under the axial load whereby that pressure is a measure of the torque being transmitted.

---

Figure 1:
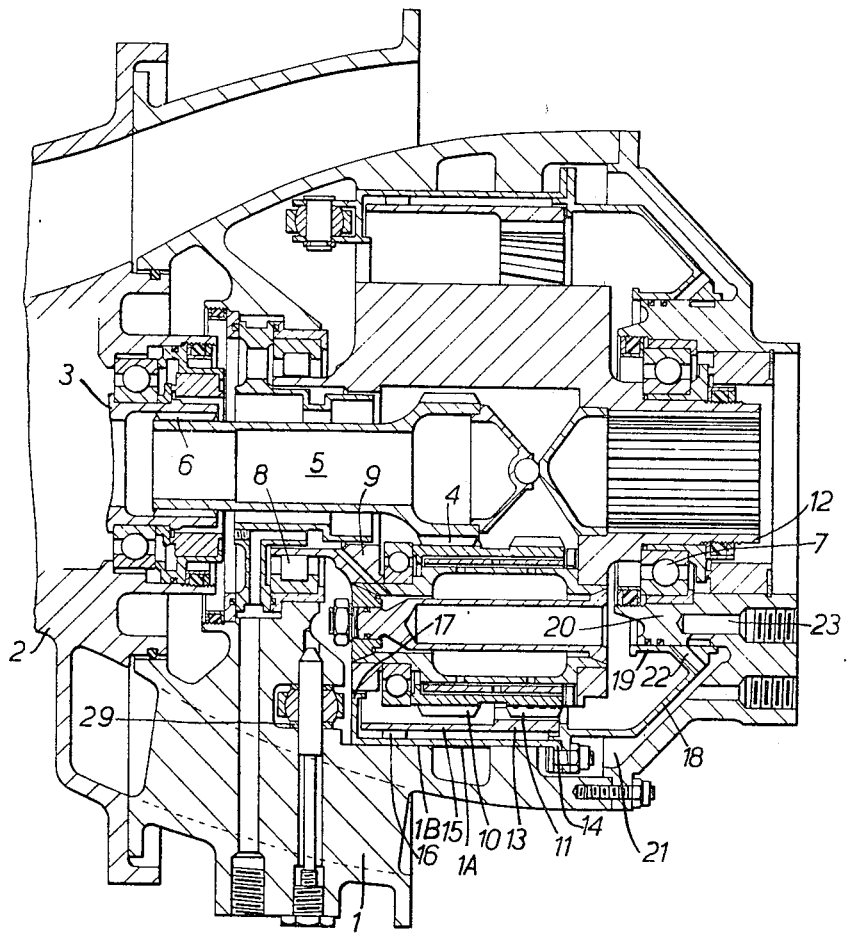

This invention relates to combined transmission gearing and torque measuring apparatus.

It has been proposed in one form combined transmission gearing and torque measuring apparatus to have a gear wheel in the gearing which is held from rotation and constitutes a reaction member, the movement of which, due to the torque imposed upon it during transmission of torque is prevented by one or more hydraulic piston and cylinder assemblies, the liquid pressure in which is measured to give an indication of the torque being transmitted. It has also been proposed in another form of such apparatus incorporating epicyclic gearing to have as the reaction member a toothed annulus which is held from rotation and is provided with helical splines on its outer circumferential surface interengaging with helical splines on a fixed casing, and the axial thrust imposed upon it by reason of the helical form of the splines is resisted by one or more piston and cylinder assemblies the liquid pressure in which is measured to provide an indication of torque.

Previous arrangements of the kind proposed have been somewhat complex and/or have suffered from lack of sensitivity. For example in the arrangement referred to employing helical splines, a considerable force may be necessary to overcome the static friction between the splines and thus initiate any axial movement of the toothed annulus so that the apparatus lacks sensitivity while in other cases the apparatus tends to give inaccurate results because the law relating liquid pressure to torque depends upon and varies with variations in the position of the reaction member.

It is an object of the present invention to provide an improved form of combined transmission gearing and torque measuring apparatus which will give an accurate and sensitive indication of the torque being transmitted at any moment, will not be excessively complex, and will provide a simple law relating torque to liquid pressure.

In one construction according to the invention the combined transmission gearing and torque measuring apparatus comprises epicyclic transmission gearing including a sunwheel, a toothed annulus constituting a reaction member, and planet wheels rotatably supported in a rotatable planet carrier and meshing with the sunwheel and the toothed annulus to provide a transmission path between the planet carrier and the sun-wheel, wherein the toothed annulus and the planet wheels meshing with it have helical teeth whereby an axial load is applied to the toothed annulus during transmission of torque, the toothed annulus is held from rotation while permitting it limited freedom for axial movement, and one or more hydraulic piston and cylinder assemblies are arranged to resist the axial load to which the toothed annulus is subject during transmission so that the liquid therein is subject to a pressure corresponding to that load, and torque indicating means responsive to such liquid pressure are provided.

Preferably the toothed annulus is held from rotation by one or more links extending between it and a fixed part.

In one form of apparatus according to the invention the planet wheels comprise one or more pairs of coaxial directly connected planet wheels of which one of the planet wheels of each pair has straight teeth meshing with the sun-wheel while the other planet wheel of each pair has helical teeth meshing with the toothed annulus.

In other arrangements according to the invention otherwise similar to the above both the planet wheels of each pair have helical teeth so that the sun-wheel also has helical teeth in which case the arrangement may be such that the axial load imposed on each pair of planet wheels by the helical teeth of one of the pair is in the opposite direction from that imposed on the other planet wheel of the pair by its helical teeth in which event the opposed axial loads imposed upon each pair of planet wheels may either exactly counterbalance one another or not.

In other forms of the invention the planet wheels may comprise a number of circumferentially spaced planet wheels each of which has helical teeth meshing with the toothed annulus and the sun-wheel.

Moreover in any case the arrangement may be such that the toothed annulus is capable of limited radial movement for the purpose of ensuring that the load transmitted to it by the planet wheels which mesh with it will be evenly distributed between such planet wheels.

Figure 3:
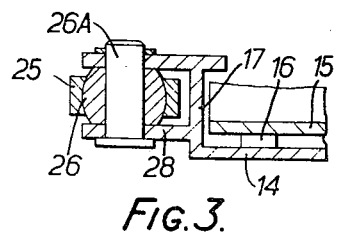
Figure 2:
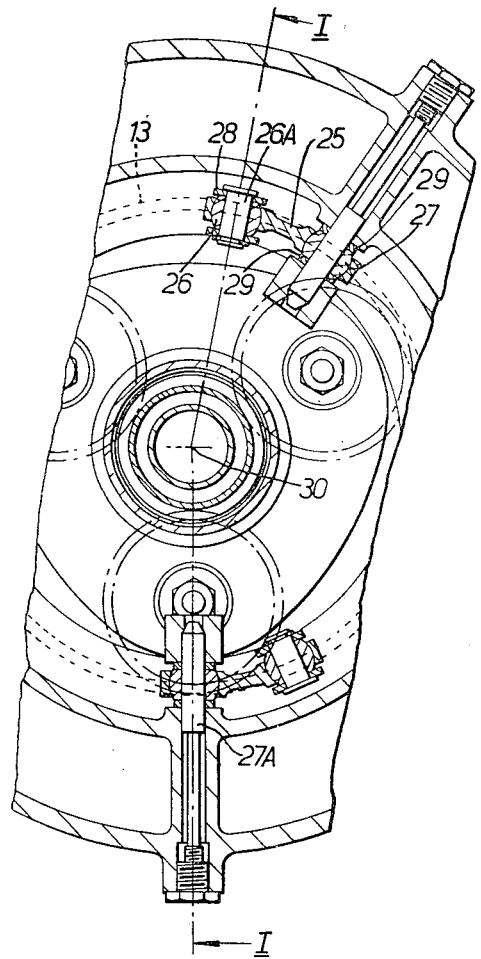

A construction according to the invention is shown by way of example in the accompanying drawings in which, FIGURE 1 is a sectional side elevation taken on the line I—I in FIGURE 2 of an assembly incorporating the invention, FIGURE 2 is a cross-section of a part of the assembly showing the manner in which the links are attached to the toothed annulus, and FIGURE 3 is a plan view showing one of the links and the manner in which it is attached respectively to the fixed casing and to the assembly including the toothed annulus.

In the construction shown in the drawings the apparatus comprises a fixed casing 1 which constitutes a gear casing secured to the forward end of the main casing 2 of an aircraft engine having a power output shaft indicated at 3 from which power is to be transmitted through the transmission gearing, say to a propeller or helicopter rotor. The transmission gearing comprises a sun-wheel 4 formed on one end of a tubular shaft 5 which is coaxial with the shaft 3 and is connected to the shaft 3 at the end remote from the sun-wheel 4 by splines indicated at 6 which permit a degree of radial "float" to the sun-wheel 4 for the purpose of ensuring even distribution of the load transmitted by it to the planet wheel assemblies hereinafter described.

Rotatably supported on ball and roller bearings indicated respectively at 7 and 8 within the casing 1 is a planet carrier 9 in which are rotatably mounted three planet wheel assemblies, of which one is shown in FIGURE 1, each planet wheel assembly comprising a pair of coaxial directly connected planet wheels 10, 11.

The sun-wheel 4 constitutes the driving element of the epicyclic transmission gearing while the planet carrier 9 constitutes the driven element and to this end, is formed integral with a short tubular internally splined driven shaft 12.

The sun-wheel 4 and each of the planet wheels 10 have straight teeth while each of the planet wheels 11 has helical teeth and meshes with the helical teeth of a toothed annulus 13 which lies, and is held from axial movement, within a tubular inner casing 14 to which it is also connected, in a manner preventing relative rotation between it and the casing, by a tubular part 15 and splines 16. The toothed annulus 13 which is thus held from axial and rotational movement relatively to the casing 14 has a limited degree of radial "float" to ensure even distribution of load between it and the planet wheels 11 with which it meshes. The casing 14 has at one end an end wall 17 which is integral with its circumferential wall while secured to the other end of its circumferential wall is an annulus of which is in sliding substantially fluid-tight engagement with a fixed piston member 20 rigid with the casing 1.

The circumferential wall of the casing 14 makes sliding substantially fluid-tight engagement with cylindrical internal surfaces 1A, 1B within the casing 1 so that it can slide axially while being radially located within the casing 1.

The helical form of the teeth of the planet wheels 11, cause an axial load to be imposed upon the toothed annulus 13 and hence upon the casing 14 and piston member 18 during transmission of power tending to move the assembly comprising the toothed annulus 13, the casing 14 and the piston 18 to the right in FIGURE 1 and this movement is opposed by liquid pressure maintained in the chamber 21 which it will be seen is closed by reason of the sealing engagement of the wall 19 and piston member 20 and of the circumferential wall of the casing 14 and the surfaces 1A and 1B. The maintenance of the liquid pressure in the chamber is effected by causing movement of the piston member 18 to the right from the position shown in FIGURE 1 to bring a passage 22 into connection or increase its communication with a source of oil pressure indicated at 23, the passage 22 being so dimensioned that it acts as a variable throttle, i.e. the greater its area in communication with the source of oil pressure the less will be the pressure loss in the passage so that the more the piston member moves to the right the greater will be the pressure in the chamber 21. Correspondingly movement of the piston member 18 to the left in FIGURE 1 closes communication between the passages 22 and 23 and thus causes a fall in pressure due to escape of oil through the clearances augmented or not by a bleed passage. Thus, increases in the axial load applied to the toothed annulus 13 and hence to the casing 14 and the piston member 18 automatically cause an increase in the pressure in the chamber 21 and reductions in such load cause automatic corresponding reductions in such pressure, such that the liquid pressure acting on the piston member 18 is always substantially precisely that required to counter-balance the axial load imposed on it by reason of the helical form of the teeth of the annulus 13 and planet wheels 11. A pressure-responsive indicator connected to the chamber 21, for example by a passage indicated at 24, will thus give an indication of the torque being transmitted at any moment.

The torque applied to the toothed annulus 13 by the planet gears 11 and hence through the splines 16 to the casing 14 is resisted by a plurality of tangentially extending links 25 the ends of each of which are connected by ball and socket joints indicated at 26 and 27 respectively to lugs 28 in the end wall 17 of the casing 15 and lugs 29 on the fixed casing 1. For convenience in FIGURE 3 the axes of the bores of the ball members have been shown as if they were parallel to one another but in practice these axes, that is to say the axes of the pins 26A, 27A which connect the ball members to the lugs, would be radial with respect to the main axis 30 of the whole assembly.

It will thus be seen that the links 25 hold the casing 14 and hence the toothed annulus 13 from rotation while permitting it limited free axial movement. As shown in FIGURE 1 the pins which connect the ball member of the joints 27 to the casing 1 are withdrawable through holes in the casing 1 from outside this casing.

While in the construction shown the sun-wheel 4 and the planet wheels 10 have straight teeth it will be appreciated that these teeth may also be helical, and the arrangement may be such that the axial load imposed on the planet wheels 10 is in the opposite direction to that imposed upon the planet wheel 11 by its helical teeth.

It will be readily understood that, instead of a single piston member such as 18, axial movement of the toothed annulus could be resisted by a number of pistons disposed in separate but intercommunicating cylinders having flow of oil under pressure thereto appropriately controlled.

What I claim as my invention and desire to secure by Letters Patent is:

1. Combined transmission gearing and torque measuring apparatus comprising epicyclic transmission gearing including a sun-wheel, a toothed annulus constituting a reaction member, and planet wheels rotatably supported in a rotatable planet carrier and meshing with the sun-wheel and the toothed annulus to provide a transmission path between the planet carrier and the sun-wheel, wherein the toothed annulus and the planet wheels meshing with it have helical teeth whereby an axial load is applied to the toothed annulus during transmission of torque, means for holding the toothed annulus from rotation and permitting it limited freedom for axial movement, one or more hydraulic piston and cylinder assemblies arranged to resist the axial load to which the toothed annulus is subject during transmission whereby the liquid therein is subject to a pressure corresponding to that load and torque indicating means responsive to such liquid pressure are provided.

2. Combined transmission gearing and torque measuring apparatus as claimed in claim 1 in which the means for holding the toothed annulus from rotation comprises links extending between it and a fixed part.

3. Combined transmission gearing and torque measuring apparatus as claimed in claim 2, in which each link extends tangentially between pivot joints respectively on the annulus and on the fixed part.

4. Combined transmission gearing and torque measuring apparatus as claimed in claim 3 in which the pivot joints give the annulus limited freedom of axial movement in relation to the fixed part.

5. Combined transmission gearing and torque measuring apparatus as claimed in claim 1 in which the planet wheels comprise one or more pairs of co-axial directly connected planet wheels of which one of the planet wheels of each pair has straight teeth meshing with the sun-wheel while the other planet wheel of each pair has helical teeth meshing with the toothed annulus.

6. Combined transmission gearing and torque measuring apparatus as claimed in claim 1 in which the planet wheels comprise one or more pairs of co-axially directly connected planet wheels of which both the planet wheels of each pair have helical teeth.

7. Combined transmission gearing and torque measuring apparatus as claimed in claim 6 in which the helical teeth of one wheel of each pair of planet wheels is inclined to apply an axial load which is opposed to an axial load applied by the helical teeth of the other wheel of the pair.

8. Combined transmission gearing and torque measuring apparatus as claimed in claim 1 in which the planet wheels comprise a number of circumferentially spaced planet wheels each of which has helical teeth meshing with the toothed annulus and the sun-wheel.

9. Combined transmission gearing and torque measuring apparatus as claimed in claim 1 in which the toothed annulus is capable of limited radial movement for the purpose of ensuring that the load transmitted to it by the planet wheels which mesh with it will be evenly distributed between such planet wheels.

References Cited

UNITED STATES PATENTS

| | | | |
|---|---|---|---|
| 2,289,285 | 7/1942 | Chilton | 73—136 |
| 2,461,001 | 2/1949 | Palen | 73—136 |
| 2,578,474 | 12/1951 | Haworth et al. | 73—136 |
| 2,899,822 | 8/1959 | Matthews | 73—136 |
| 3,313,150 | 4/1967 | Hulbert | 73—136 |
| 3,373,603 | 3/1968 | Chapman | 73—136 |

CHARLES A. RUEHL, Primary Examiner